United States Patent
Miranda et al.

(10) Patent No.: US 7,170,334 B2
(45) Date of Patent: Jan. 30, 2007

(54) SWITCHED CURRENT TEMPERATURE SENSING CIRCUIT AND METHOD TO CORRECT ERRORS DUE TO BETA AND SERIES RESISTANCE

(75) Inventors: Evaldo M. Miranda, Saratoga, CA (US); A. Paul Brokaw, Tucson, AZ (US)

(73) Assignee: Analog Devices, Inc., Norwood, MA (US)

( * ) Notice: Subject to any disclaimer, the term of this patent is extended or adjusted under 35 U.S.C. 154(b) by 80 days.

(21) Appl. No.: 11/170,970

(22) Filed: Jun. 29, 2005

(65) Prior Publication Data

US 2007/0001744 A1    Jan. 4, 2007

(51) Int. Cl.
*H01L 35/00*    (2006.01)

(52) U.S. Cl. .................................. 327/512
(58) Field of Classification Search ............. 327/512, 327/513; 374/178
See application file for complete search history.

(56) References Cited

U.S. PATENT DOCUMENTS

| | | | |
|---|---|---|---|
| 5,195,827 A | 3/1993 | Audy et al. | 374/172 |
| 5,686,858 A * | 11/1997 | Malherbe | 327/512 |
| 5,982,221 A | 11/1999 | Tuthill | 327/512 |
| 6,097,239 A | 8/2000 | Miranda, Jr. et al. | 327/512 |
| 6,554,469 B1 | 4/2003 | Thomson et al. | 374/178 |

OTHER PUBLICATIONS

Gray, Paul R. et al.; "Analysis and Design of Analog Integrated Circuits", Third Edition, Copyright 1993, pp. 454-460.
Bakker, Anthonius, "High-Accuracy CMOS Smart Temperature Sensors", Copyright 2000, pp. 106-116.
Analog Devices, "Low-Noise, Precision Operational Amplifier OP27", Copyright 2003, pp. 1-20.

* cited by examiner

Primary Examiner—Jeffrey Zweizig
(74) Attorney, Agent, or Firm—Koppel, Patrick & Heybl

(57) ABSTRACT

A switched current temperature sensing circuit comprises a BJT arranged to conduct a forced emitter current $I_E$ of the form $I_{fixed}+(I_{fixed}/\beta)$, such that the base current is given by $I_{fixed}/\beta$ and the collector current is given by $I_{fixed}+(I_{fixed}/\beta)-(I_{fixed}/\beta)=I_{fixed}$. Base current $I_{fixed}/\beta$ is mirrored to the emitter, and a current source provides current $I_{fixed}$, which is switched between at least a first value I and a second value N*I such that the BJT's base-emitter voltage has a first value $V_{be1}$ when $I_{fixed}=I$ and a second value $V_{be2}$ when $I_{fixed}=N*I$, such that:

$$\Delta V_{be12}=V_{be1}-V_{be2}=(n_F kT/q)(\ln N),$$

where $n_F$ is the BJT's emission coefficient, k is Boltzmann's constant, T is absolute temperature, and q is the electron charge.

28 Claims, 5 Drawing Sheets

SWITCHED CURRENT TEMPERATURE SENSING CIRCUIT AND METHOD TO CORRECT ERRORS DUE TO BETA AND SERIES RESISTANCE

BACKGROUND OF THE INVENTION

1. Field of the Invention

This invention relates to the field of temperature sensing circuits, and particularly to circuits which force multiple emitter currents through a bipolar transistor to sense temperature.

2. Description of the Related Art

Bipolar transistors (BJTs) are frequently used as thermal sensing devices, since a BJT's base-emitter voltage ($V_{be}$) varies with temperature in accordance with:

$$V_{be} = n_F kT/q * \ln(I_C/I_S)$$

where $n_F$ is the BJT's emission coefficient, k is Boltzmann's constant, T is absolute temperature, q is the electron charge, $I_C$ is the collector current, and $I_S$ is the saturation current. For integrated circuits (ICs) fabricated using standard bulk CMOS processes, it is particularly convenient to use substrate PNP (SPNP) transistors to sense temperature. These SPNP devices can be located, for example, on a remote die (e.g., a CPU) which is intended to have its temperature measured by another circuit located on a separate die (e.g., an ASIC).

Methods of employing BJTs to sense temperature are described, for example, in U.S. Pat. Nos. 5,195,827, 5,982,221, and 6,097,239. These references, which employ one or more PNP transistors as thermal sensors, force two or more emitter currents which are in a fixed ratio (N) to each other (I, N*I) to create two ratioed collector currents ($I_C$, $I_{CN}$). When so doing, the above non-linear equation is simplified such that the temperature of the BJT is a linear function of absolute temperature (T). Assuming $N = I_{CN}/I_C$:

$$V_{BEN} - V_{BE1} = \Delta V_{BE} = (n_F kT/q)\ln(I_{CN}/I_C), \text{ and}$$

$$V_{BEN} - V_{BE1} = \Delta V_{BE} = (n_F kT/q)\ln(N),$$

where $V_{BEN}$ and $V_{BE1}$ are the BJT's base-emitter voltages for emitter currents of N*I and I, respectively.

However, though the ratio of emitter currents may be fixed, the ratio of the resulting collector currents depends on the BJT's beta value ($\beta$)—which varies with collector current and temperature. Thus, the accuracy of the measured temperature using this method depends on the ratio of the emitter currents, and the $\beta$ value of the BJT and its variation. Assuming that two currents (I and N*I) are forced into the emitter of a SPNP transistor:

for emitter current I, collector current $I_C = \beta I/(\beta+1)$;

for emitter current N*I, $I_{CN} = N*\beta_N I/(\beta_N+1)$.

If $\beta_N = \beta + \Delta\beta = \beta(1 \pm \epsilon)$, and $\epsilon = \Delta\beta/\beta$, and assuming $\beta_N = \beta(1+\epsilon)$:

$$\Delta V_{BE} = (n_F kT/q)[\ln(I_{CN}/I_C)] \quad \text{[Eq. 1a]}$$

and $$\Delta V_{BE} = (n_F kT/q)\{\ln[[((1+\epsilon)(\beta+1))/(1+\epsilon)\beta+1)]*N]\},$$
$$\text{where } \epsilon = \Delta\beta/\beta. \quad \text{[Eq. 1b]}$$

From equation 1, it is clear that $\beta$ errors affect the ratio of collector currents and therefore the measured $\Delta V_{BE}$ voltage used to compute the device temperature. In addition, the accuracy of the temperature measurement may be reduced by ohmic resistances associated with the BJT, specifically its base and emitter resistances.

One method to solve equation 1a is to measure $I_{CN}$ and $I_C$ by simply subtracting the return base current from the forced emitter current, with $I_C = I_E - I_B$ and $I_{CN} = I_{EN} - I_{BN}$. Once the two collector currents are measured, their ratios can be calculated. Another method is to force $I_E$ and measure $I_C = I_E - I_B$. Then, force $I_{EN}$ until $I_{CN} = N*I_C$ where $I_{CN}$ is measured as $I_{CN} = I_{EN} - I_{BN}$. These methods are considered indirect methods, as the multiplied version of $I_C$ (i.e., $I_{CN} = N*I_C$) is obtained by forcing an emitter current and measuring the collector current indirectly as $I_C = I_E - I_B$ using a separate circuit.

SUMMARY OF THE INVENTION

A switched current temperature sensing circuit is presented which overcomes the problems noted above, largely eliminating $\beta$ and series resistance-related temperature measurement errors.

The present temperature sensing circuit comprises a single BJT, suitably a SPNP, arranged to conduct a forced emitter current $I_E$ of the form $I_{fixed} + (I_{fixed}/\beta)$, where $\beta$ is the BJT's $\beta$ value, such that the BJT's base current is given by $I_{fixed}/\beta$ and its collector current is given by $I_{fixed} + (I_{fixed}/\beta) - (I_{fixed}/\beta) = I_{fixed}$. A current mirror circuit is arranged to mirror the base current $I_{fixed}/\beta$ to the emitter, and a current source provides current $I_{fixed}$. In operation, current $I_{fixed}$ is switched between a first value I and a second value N*I, such that the BJT's base-emitter voltage $V_{be}$ has a first value $V_{be1}$ when $I_{fixed} = I$ and a second value $V_{be2}$ when $I_{fixed} = N*I$, such that:

$$\Delta V_{be21} = V_{be2} - V_{be1} = (n_F kT/q)(\ln N),$$

where $n_F$ is the BJT's emission coefficient, k is Boltzmann's constant, T is absolute temperature, and q is the electron charge. In this way, errors due to variations in the BJT's $\beta$ value are eliminated. The present invention can also be implemented so as to eliminate temperature measurement errors that might otherwise arise due to base and/or emitter resistances associated with the BJT.

Further features and advantages of the invention will be apparent to those skilled in the art from the following detailed description, taken together with the accompanying drawings.

DETAILED DESCRIPTION OF THE INVENTION

The present invention provides a switched current temperature sensing circuit and method which operates by forcing multiple emitter currents through a BJT to sense temperature. The invention largely eliminates measurement errors that might otherwise arise due to β variations, and can also be configured to eliminate temperature measurement errors that might otherwise arise due to base and/or emitter resistances associated with the BJT.

Figure 1:
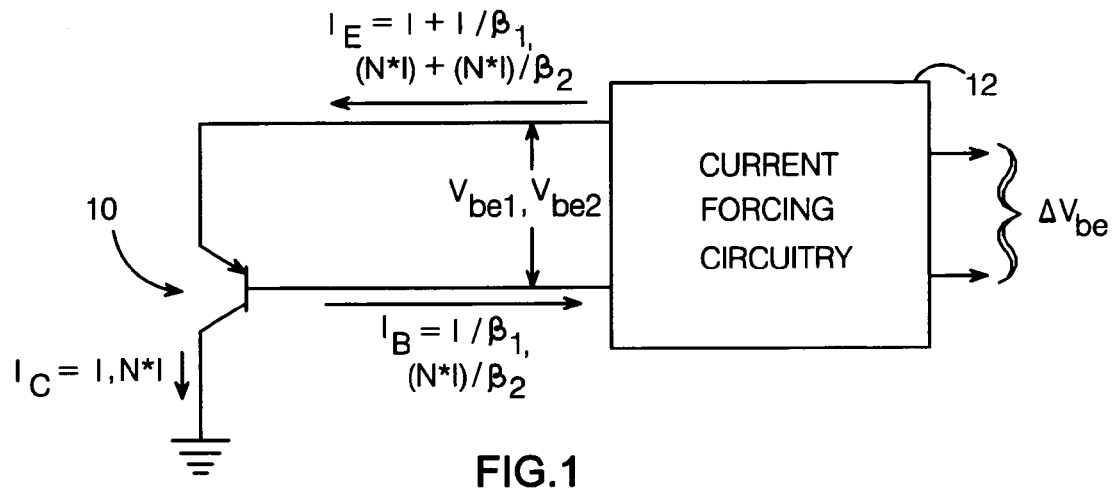
FIG. 1 is a block/schematic diagram illustrating the basic principles of a temperature sensing circuit per the present invention.

The basic principles of the invention are illustrated in FIG. 1. A single BJT 10 serves as the temperature sensing transistor. BJT 10 is shown here as a PNP, although the invention could alternatively be configured to employ an NPN. BJT 10 is suitably a SPNP, though this is not essential. The temperature sensing circuit also includes current forcing circuitry 12, which is arranged to sequentially force at least two emitter currents, each of which results in a collector current that is independent of the BJT's β value. This is accomplished by providing an emitter current $I_E$ which is not necessarily fixed, but rather is of the form $I_E = I_{fixed} + I_{fixed}/\beta$, where $I_{fixed}$ can be set to one of at least two different fixed current values, and β is the β value of BJT 10 at each $I_{fixed}$ value; thus, $I_E$ will vary with β. Due to the inherent properties of a BJT, providing a forced emitter current of this form results in a base current $I_B$ given by $I_{fixed}/\beta$, and a collector current $I_C$ being given by $I_{fixed} + I_{fixed}/\beta - I_{fixed}/\beta = I_{fixed}$.

Current forcing circuitry 12 is arranged to sequentially provide at least two values of $I_{fixed}$. At a minimum, $I_{fixed}$ values of I and N*I are provided. A BJT's β value varies with collector current, so the β of BJT 10 has a first value ($\beta_1$) when $I_{fixed} = I$ and a second value ($\beta_2$) when $I_{fixed} = N*I$. When $I_{fixed}$ is set equal to I, $I_E = I + I/\beta_1$, $I_B = I/\beta_1$, and $I_C = I + I/\beta_1 - I/\beta_1 = I$. Under these conditions, the BJT has a $V_{be}$ voltage identified as $V_{be1}$. When $I_{fixed}$ is set equal to N*I, $I_E = (N*I) + (N*I)/\beta_2$, $I_B = (N*I)/\beta_2$, $I_C = (N*I) + (N*I)/\beta_2 - (N*I)/\beta_2 = I$, and $V_{be} = V_{be2}$. Thus, for both forced emitter currents, collector current $I_C$ is independent of β, and thus is immune to any variations in the BJT's β value. Sequentially occurring currents are denoted on the figures using the form "A,B"; note that currents B could follow currents A, or vice versa.

When so arranged, a $\Delta V_{be21}$ value can be calculated from $V_{be1}$ and $V_{be2}$, as follows:

$\Delta V_{be21} = V_{be2} - V_{be1} = (n_F kT/q)(\ln N)$,     [Eq. 2]

where $n_F$ is the BJT's emission coefficient, k is Boltzmann's constant, T is absolute temperature in degrees Kelvin, and q is the electron charge. Thus, by measuring $\Delta V_{be21}$ and knowing N, a value for T can be calculated which is immune from error that might otherwise arise as a result of variations in the BJT's β value.

Figure 2:
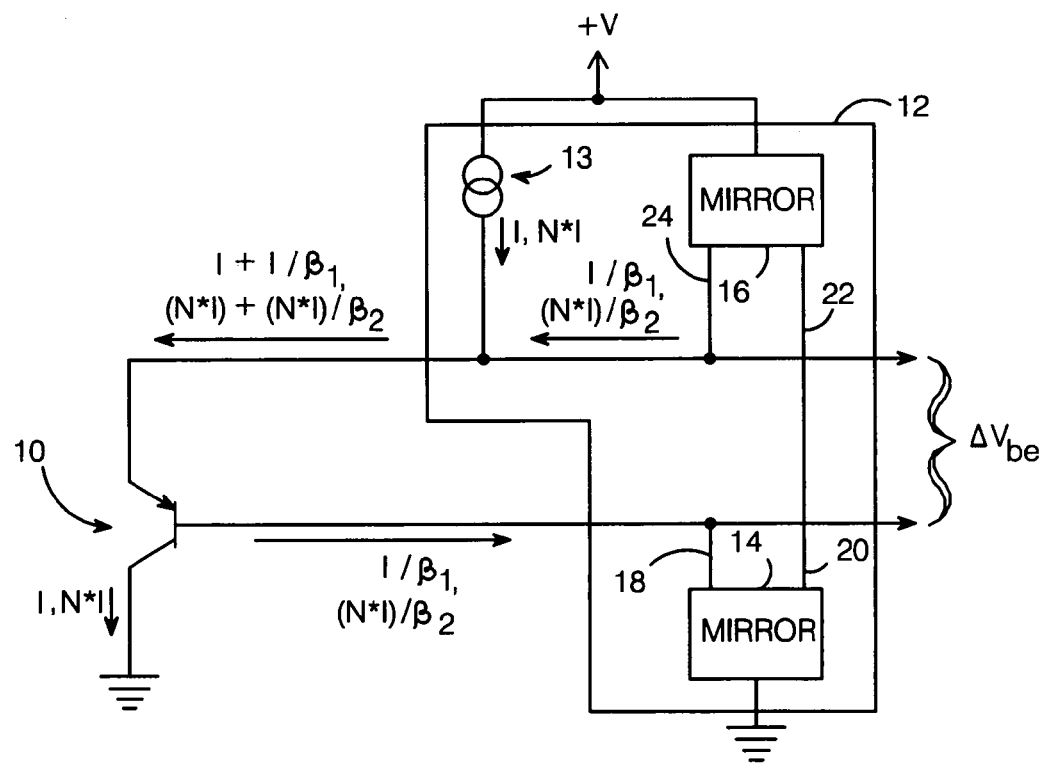
FIG. 2 is a block/schematic diagram illustrating one possible embodiment of a temperature sensing circuit per the present invention.

One way in which an emitter current of the form $I_E = I_{fixed} + I_{fixed}/\beta$ can be forced is shown in FIG. 2. Here, current forcing circuitry 12 comprises a current mirror circuit which mirrors the BJT's base current $I_B$ back to its emitter, and a current source 13 which provides the at least two $I_{fixed}$ values. In this exemplary embodiment, the current mirror circuit comprises a lower mirror 14 and an upper mirror 16. Lower mirror 14 receives $I_B$ at its input 18 and mirrors it via its output 20 to the input 22 of upper mirror 16. Upper mirror 16 mirrors the current received from lower mirror 14 via its output 24 to the BJT's emitter.

In this illustration, current source 13 is arranged to provide two values of $I_{fixed}$: I and N*I. These currents are summed with the output of upper mirror 16 to provide the required forced emitter currents of the form $I_E = I_{fixed} + I_{fixed}/\beta$. Thus, when $I_{fixed} = I$, base current $I_B = I/\beta_1$, which is mirrored by the lower and upper mirrors to provide the $I/\beta_1$ portion of the forced current, such that $I_E = I + I/\beta_1$. Then when $I_{fixed} = N*I$, base current $I_B = (N*I)/\beta_2$, which is mirrored by the lower and upper mirrors to provide the $(N*I)/\beta_2$ portion of the forced current, such that $I_E = (N*I) + (N*I)/\beta_2$.

Figure 3:
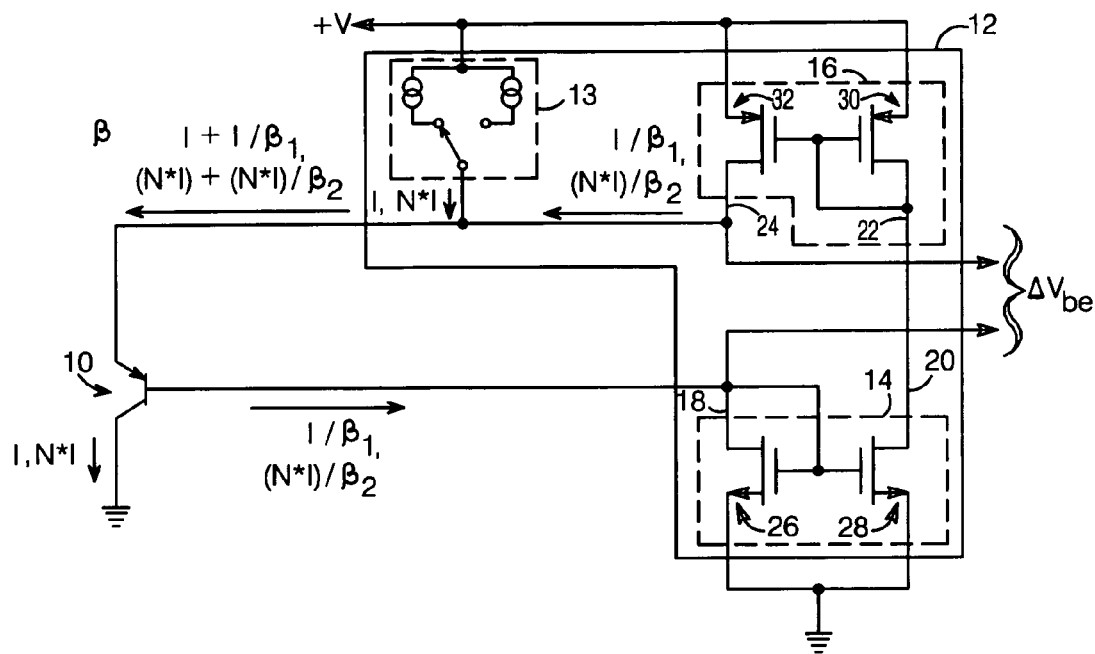
FIG. 3 is a schematic diagram illustrating another possible implementation of the embodiment shown in FIG. 2.

FIG. 3 depicts one possible implementation of the embodiment shown in FIG. 2. Here, current source 13 is made from two fixed current sources, each of which provides a different output current, and a switch which is operated to select one or the other of the fixed output currents as the current source's output $I_{fixed}$. In this example, one of the fixed current sources would output current I and the other would output current N*I. Lower mirror 14 is made from a diode-connected FET 26 and a FET 28, and upper mirror 16 comprises diode-connected FET 30 and a FET 32. The mirrors should be arranged such that the ratio of the current at upper mirror output 24 to the current at lower mirror input 18 is 1:1.

As noted above, the invention requires that current source 13 provide at least two values of $I_{fixed}$. Note that more than two currents will be preferred in some applications (discussed below). Further note that the implementation of current source 13 shown in FIG. 3 is merely exemplary; there are numerous methods by which two or more currents could be produced as required by the present invention.

Figure 4:
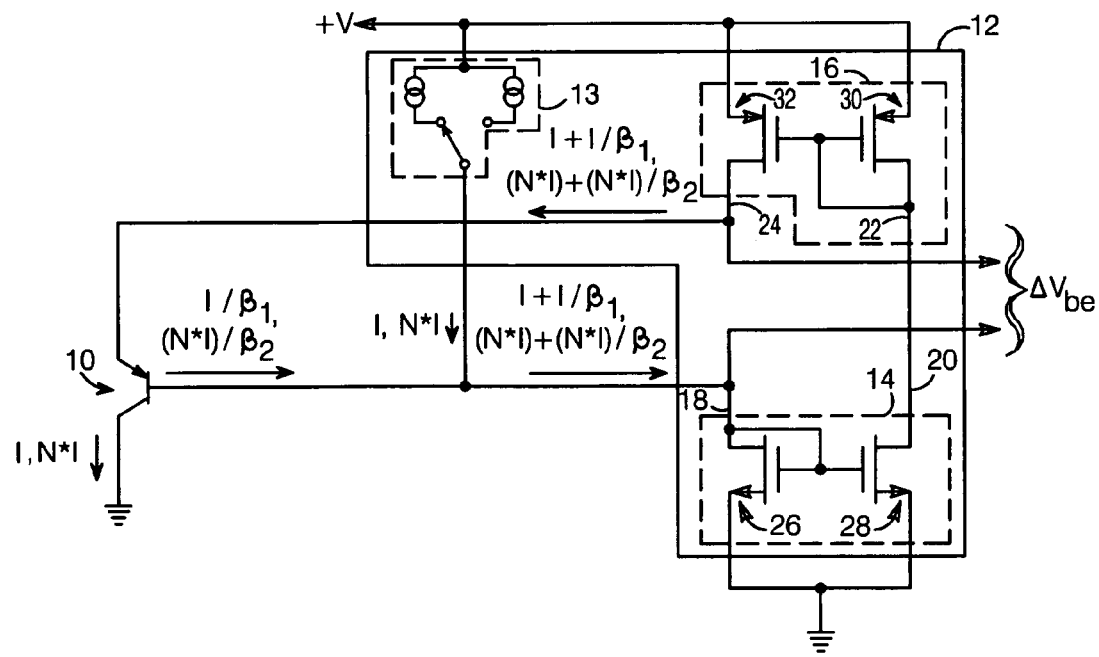
FIG. 4 is a schematic diagram illustrating another possible embodiment of a temperature sensing circuit per the present invention.

An alternative arrangement for current forcing circuitry 12 is shown in FIG. 4. Here, the output of current source 13 is connected to the base of BJT 10 rather than the emitter. As before, current source 13 provides at least two values of $I_{fixed}$, shown in this example as I and N*I. For this arrangement, the current that gets mirrored by the lower and upper mirrors is the sum of the $I_{fixed}$ and $I_b$ currents, such that the forced emitter currents are exactly as before: $I + I/\beta_1$ when $I_{fixed} = I$ and $(N*I) + (N*I)/\beta_2$ when $I_{fixed} = N*I$.

Figure 5A:
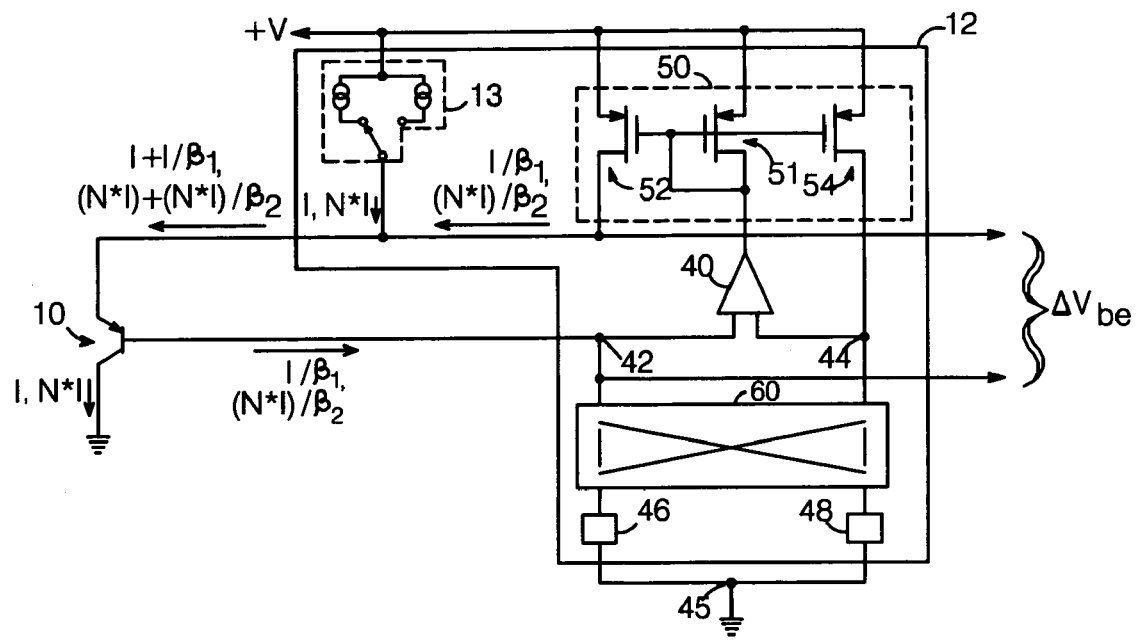
FIG. 5a is a schematic diagram illustrating another possible embodiment of a temperature sensing circuit per the present invention.

Another possible implementation for current forcing circuitry 12 is shown in FIG. 5a. Here, the current mirror circuit includes an operational amplifier 40 having differential inputs connected to nodes 42 and 44, respectively. Nodes 42 and 44 are coupled to a circuit common point 45, typically ground, via elements 46 and 48, respectively; elements 46 and 48 may be diodes, diode-connected transistors, or resistors. The base of BJT 10 is connected to node 42. The output of amplifier 40 is provided to the input of a current mirror 50, which includes an input FET 51, one output FET 52 connected to mirror the current from amplifier 40 to the emitter of BJT 10, and another output FET 54 connected to mirror the current from amplifier 40 to node 44.

In operation, element 46 conducts the base current of BJT 10, with the resulting voltage at node 42 applied to one input of amplifier 40. Amplifier 40 operates such that its output causes the current provided by output FET 54 and conducted by element 48 to develop a voltage at node 44 equal to that at node 42. If elements 46 and 48 are matched, the current provided by output FET 54—as well as the current provided by output FET 52 to the emitter of BJT 10—will be equal to the BJT's base current.

A chopping network 60 might be employed between nodes 42 and 44 and elements 46 and 48, to eliminate errors that might arise due to mismatches between elements 46 and 48. Amplifier 40 might also be chopped in order to reduce its offset voltage and errors on the mirror, and mirror 50 might be chopped to further reduce mismatch errors.

Figure 5B:
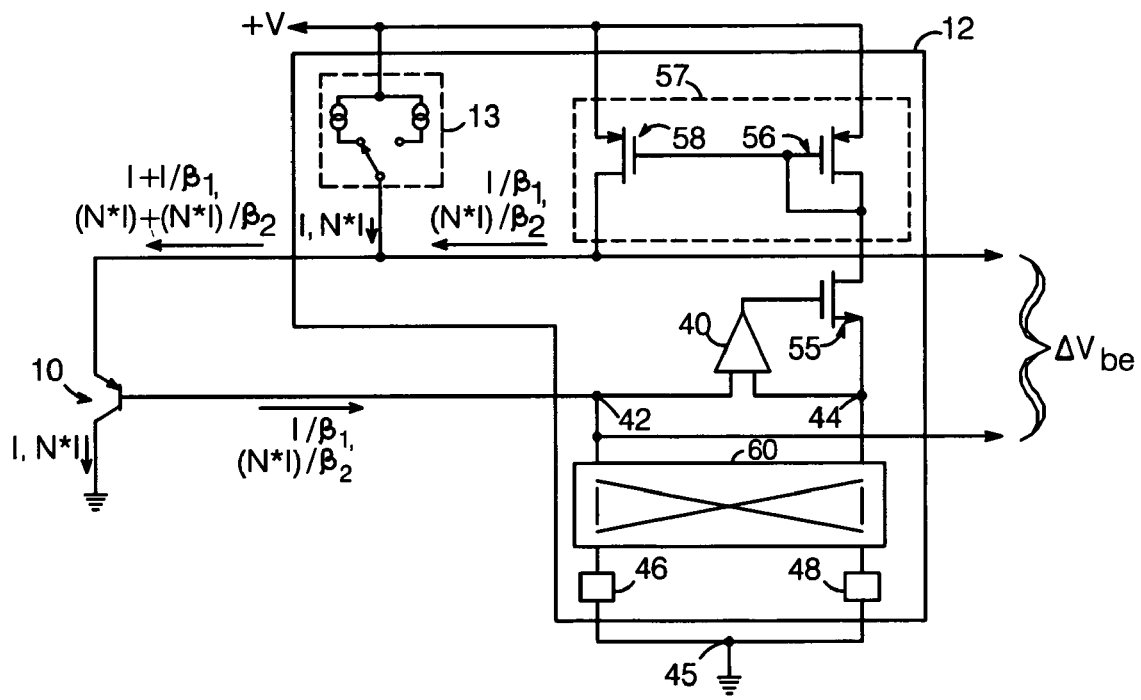
FIG. 5b is a schematic diagram illustrating another possible embodiment of a temperature sensing circuit per the present invention.

An alternate version of the embodiment shown in FIG. 5a is shown in FIG. 5b. This implementation is similar to that of FIG. 5a, except here the output of amplifier 40 is provided to the gate of a FET 55, which has its drain connected to the input FET 56 of a mirror 57, and its source connected to node 44. Mirror 57 includes an output FET 58 connected to mirror the current in FET 56 to the emitter of BJT 10. Amplifier 40 operates such that its output causes the current conducted by FET 55 and element 48 to develop a voltage at node 44 equal to that at node 42; the current conducted by FET 55 is mirrored by mirror 57 to the emitter of BJT 10. If elements 46 and 48 are matched, the current conducted by FET 55—as well as the current provided by output FET 58 to the emitter of BJT 10—will be equal to the BJT's base current. As in FIG. 5a, a chopping network 60 might be employed between nodes 42 and 44 and elements 46 and 48, to eliminate errors that might arise due to mismatches between elements 46 and 48, and amplifier 40 and mirror 57 might also be chopped.

Figure 6:
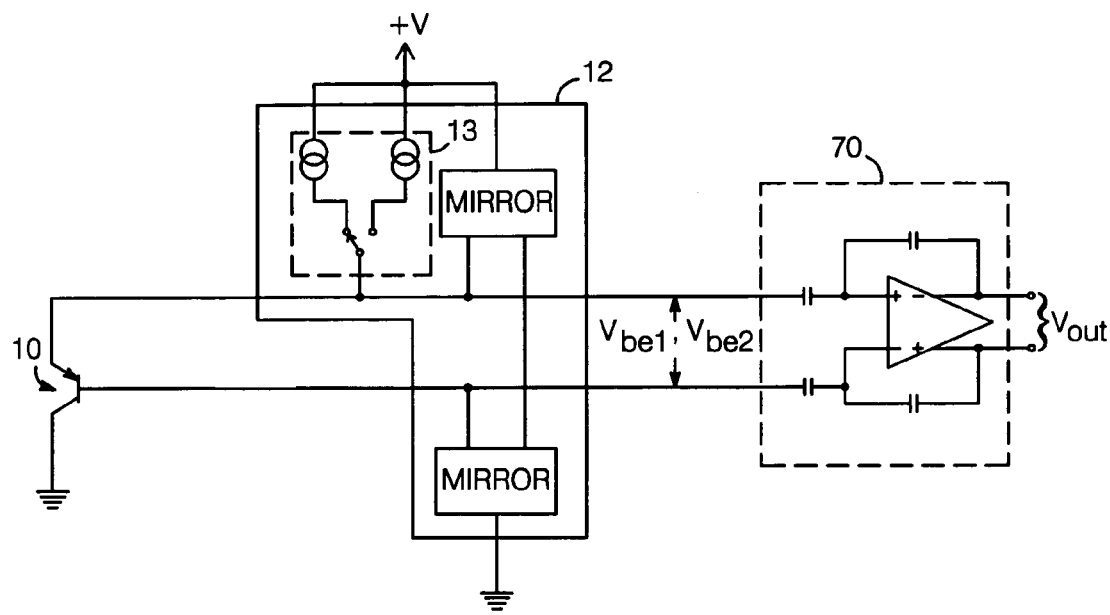
FIG. 6 is a block/schematic diagram illustrating a following circuit which might be used with a temperature sensing circuit per the present invention.

As shown in FIG. 6, the present invention would typically be connected to circuitry 70 capable of receiving $V_{be1}$ and $V_{be2}$ and producing an output ($V_{out}$) which varies with $\Delta V_{be21}$. A basic implementation of circuitry 70 is shown in FIG. 6; other examples are found, for example, in U.S. Pat. No. 5,982,221 and U.S. Pat. No. 6,097,239.

The present invention is preferably arranged such that the collector currents resulting from the emitter currents forced into the device follow Shockley's equation ($V_{BE} = n_F kT/q * \ln(I_C/I_S)$). At high level injection, emission coefficient $n_F$ may differ from its value in the low level injection region. The forced currents should be selected to ensure that $n_F$ remains relatively unchanged as the currents are scaled.

As noted above, the accuracy of the temperature measurement may be reduced by ohmic resistances associated with the BJT, specifically its base and emitter resistances $R_B$ and $R_E$, respectively. These resistances may be considered to include both the internal resistances inherent in the device, and the resistances associated with connecting lines. Resistances $R_B$ and $R_E$ affect the BJT's $V_{be}$ as follows:

$$V_{BE} = n_F kT/q * \ln(I_C/I_S) + R_E * I_E + R_B * I_B. \quad [\text{Eq. 3}]$$

When $I_{fixed}$ is set equal to I and N*I as described above, the effect of the resistances on $\Delta V_{be21}$ is as follows:

$$\Delta V_{be21} = n_F kT/q * \ln(I_{C2}/I_{C1}) + \{(R_{E2}I_{E2} - R_{E1}I_{E1}) + (R_{B2}I_{B2} - R_{B1}I_{B1})\} \quad [\text{Eq. 4}],$$

where $I_{C1}=I$, $I_{C2}=N*I$, $I_{E1}=I+I/\beta_1$, $I_{E2}=(N*I)+(N*I)/\beta_2$, $I_{B1}=I/\beta_1$ and $I_{B2}=(N*I)/\beta_2$, and where all terms with subscripts "1" or "2" refer to values when $I_{fixed}=I$ or $I_{fixed}=N*I$, respectively. Since implementing the invention as described above forces the collector currents to scale without β errors, the $n_F kT/q * \ln(I_{C2}/I_{C1})$ term in equation 4 is independent of β and series resistance; however the remainder of the equation is not.

Assuming the series resistances are largely independent of current densities, $R_E = R_{E2} = R_{E1}$ and $R_B = R_{B2} = R_{B1}$; the β terms, however, are still dependent on current densities and temperature. Substituting:

$$\Delta V_{be21} = n_F KT/q * \ln N + \{R_E(I_{E2} - I_{E1}) + R_B(I_{B2} I_{B1})\}, \quad [\text{Eq. 5}]$$

and $$\Delta V_{be21} = n_F KT/q * \ln N + \{R_E[(N*I + N*I/\beta_2) - (I + I/\beta_1)] + R_B(N*I/\beta_2 - I/\beta_1)\}. \quad [\text{Eq. 6}]$$

'I' is a common multiplier, so that equation 6 can be rewritten as follows:

$$\Delta V_{be21} = n_F KT/q * \ln N + \{R_E[(N + N/\beta_2) - (1 + 1/\beta_1)] + R_B(N/\beta_2 - 1/\beta_1)\} * I. \quad [\text{Eq. 7}]$$

If 'I' is scaled again by setting $I_{fixed}$ equal to two more currents $I_3 = a*I$ and $I_4 = a*N*I$ in accordance with the method described above (yielding base-emitter voltages $V_{be3}$ and $V_{be4}$, respectively), where 'a' causes a small enough change such that $\beta_3 \approx \beta_1$ and $\beta_4 \approx \beta_2$ (e.g., 1<a<2), then:

$$\Delta V_{be43} = V_{be4} - V_{be3} = n_F KT/q * \ln N + \{R_E[(N + N/\beta_2) - (1 + 1/\beta_1)] + R_B(N/\beta_2 - 1/\beta_1)\} * a * I. \quad [\text{Eq. 8}]$$

If $\Delta V_{be21}$ is subtracted from $\Delta V_{be12}$:

$$\Delta V_{be43} - \Delta V_{be21} = \{R_E[(N + N/\beta_2) - (1 + 1/\beta_1)] + R_B(N/\beta_2 - 1/\beta_1)\} * (a-1) * I. \quad [\text{Eq. 9}]$$

Equation 9 is a multiple of the second term of equation 7, with the multiple being (a−1).

Re-writing equations 7 and 9 as equations 7.1 and 9.1, respectively:

$$\Delta V_{be21} = n_F KT/q * \ln N + \{R_E[(N + N/\beta_2) - (1 + 1/\beta_1)] + R_B(N/\beta_2 - 1/\beta_1)\} * I. \quad \text{Eq. 7.1}$$

$$\Delta V_{be43} - \Delta V_{be21} = \{R_E[(N + N/\beta_2) - (1 + 1/\beta_1)] + R_B(N/\beta_2 - 1/\beta_1)\} * (a-1) * I. \quad \text{Eq. 9.1}$$

If Eq. 9.1 is multiplied by a value 'b' such that: (a−1)*b=1, then:

$$b * (\Delta V_{be43} - \Delta V_{be21}) = \{R_E[(N + N/\beta_2) - (1 + 1/\beta_1)] + R_B(N/\beta_2 - 1/\beta_1)\} * (a-1) * I * b = \{R_E[(N + N/\beta_2) - (1 + 1/\beta_1)] + R_B(N/\beta_2 - 1/\beta_1)\} * 1 * I. \quad [\text{Eq. 10}]$$

If equation 10 is subtracted from equation 7.1, then:

$$\Delta V_{be21} - \{b * (\Delta V_{be43} - \Delta V_{be21})\} = n_F KT/q * \ln N. \quad [\text{Eq. 11}]$$

Thus, to make a temperature determination which is independent of β and series resistance:

a first set of emitter currents are sequentially forced, with $I_{fixed}$ set equal to I and N*I, to produce $V_{be1}$, $V_{be2}$, and $\Delta V_{be21} = V_{be2} - V_{be1}$ values;

a second set of emitter currents are sequentially forced, with $I_{fixed}$ set equal to a*I and a*N*I, to produce $V_{be3}$, $V_{be4}$, and $\Delta V_{be43} = V_{be4} - V_{be3}$ values;

value b=1/(a−1) is computed; and

Equation 11 is solved for T.

Figure 7:
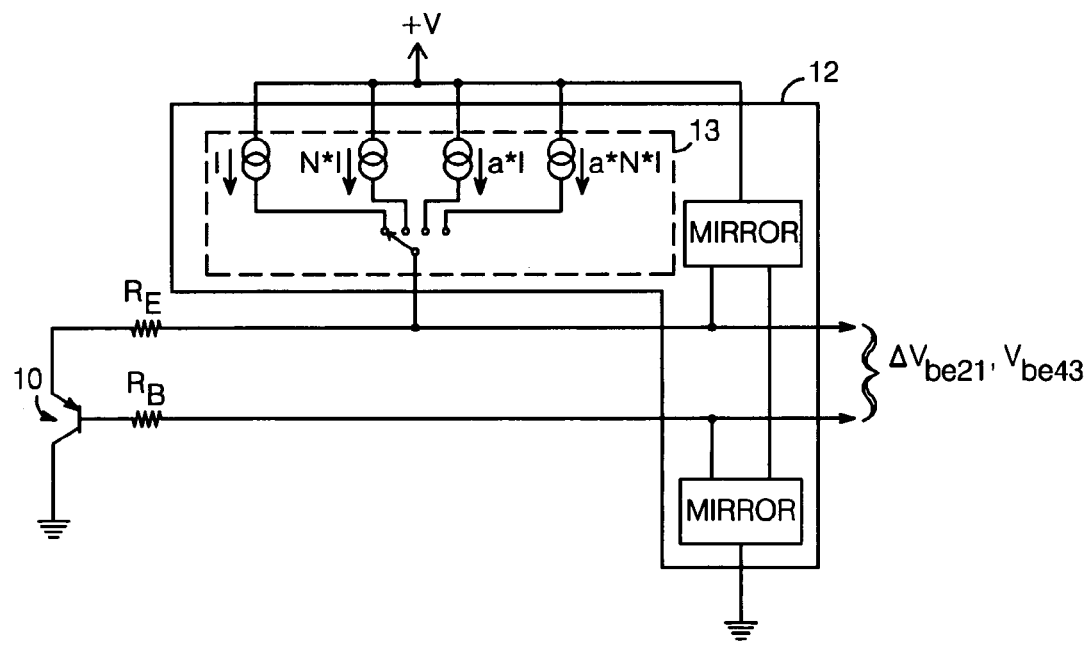
FIG. 7 is a block/schematic diagram illustrating another possible embodiment of a temperature sensing circuit per the present invention.
Figure 8:
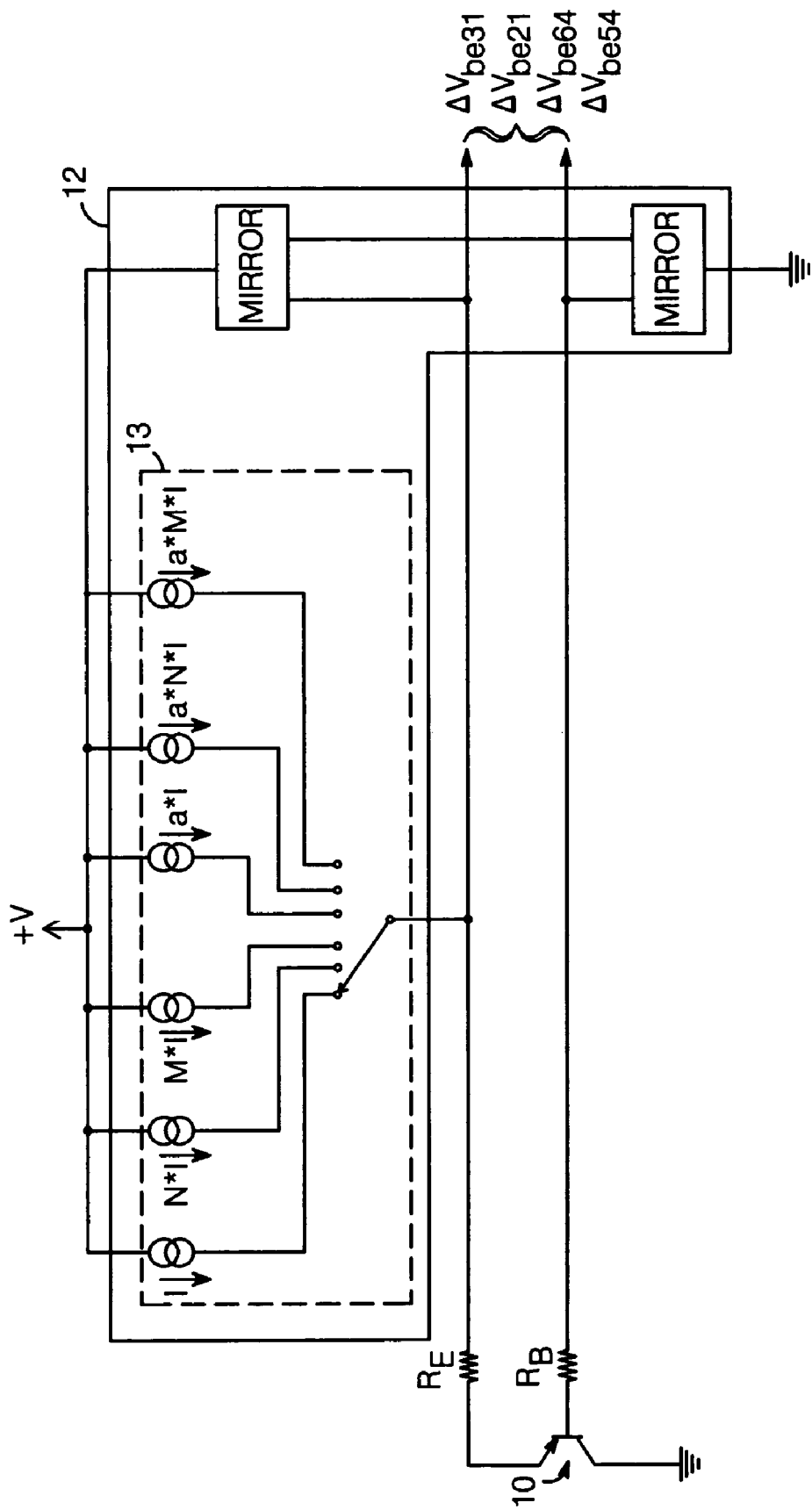
FIG. 8 is a block/schematic diagram illustrating another possible embodiment of a temperature sensing circuit per the present invention.

One possible circuit implementation for performing this method is shown in FIG. 7. The configuration is similar to those described above, except here current source 13 is capable of sequentially providing four $I_{fixed}$ values: I, N*I, a*I and a*N*I in this example.

For eliminating errors due to large series resistance values, a six current technique may be employed. Assume $I_{fixed}$ is set to a first set of three currents (I, N*I, M*I), which give rise to respective β values ($β_1, β_2, β_3$) when applied to a BJT. Then:

$$\Delta V_{BE21} = n_F KT/q * \ln(I_{C2}/I_{C1}) + \{(R_{E2}I_{E2} - R_{E1}I_{E1}) + + (R_{B2}I_{B2} - R_{B1}I_{B1})\}, \text{ and}$$

$$\Delta V_{BE31} = n_F KT/q * \ln(I_{C3}/I_{C1}) + \{(R_{E3}I_{E3} - R_{E1}I_{E1}) + + (R_{B3}I_{B3} - R_{B1}I_{B1})\}$$

where $I_{C1}=I$, $I_{C2}=N*I$, $I_{C3}=M*I$, $I_{E1}=I+I/β_1$, $I_{E2}=(N*I)+(N*I)/β_2$, $I_{E3}=(M*I)+(M*I)/β_3$, $I_{B1}=I/β_1$, $I_{B2}=(N*I)/β_2$, $I_{B3}=(M*I)/β_3$, $\Delta V_{BE21}=V_{BE2}-V_{BE1}$, $\Delta V_{BE31}=V_{BE3}-V_{BE1}$, and where all terms with subscripts "1", "2", or "3" refer to values when $I_{fixed}=I$, $I_{fixed}=N*I$, or $I_{fixed}=M*I$, respectively.

In general:

$$I_{C2}/I_{C1} = \{[β_2/(β_2+1)]/[β_1/(β_1+1)]\}*N, \text{ and}$$

$$I_{C3}/I_{C1} = \{[β_3/(β_3+1)]/[β_1/(β_1+1)]\}*M.$$

However, if β is not constant due to the characteristics of the BJT, the present invention can be used to ensure that $(I_{C3}/I_{C1})=M$ and $(I_{C2}/I_{C1})=N$, which would result in the following:

$$\Delta V_{BE21} = n_F KT/q * \ln N + \{R_E(I_{E2}-I_{E1}) + R_B(I_{B2}-I_{B1})\}, \text{ and}$$

$$\Delta V_{BE31} = n_F KT/q * \ln M + \{R_E(I_{E3}-I_{E1}) + R_B(I_{B3}-I_{B1})\}.$$

The ratios of $I_{E2}/I_{E1}$, $I_{E3}/I_{E1}$ and respectively $I_{B2}/I_{B1}$, $I_{B3}/I_{B1}$ are unknown because β is not constant. In accordance with the invention, the BJT's emitter and base currents are modified automatically by the mirror circuitry in order to guarantee that the collector current is a replica of the forced currents I, N*I and M*I. Assuming $R_{E3}=R_{E2}=R_{E1}$ and $R_{B3}=R_{B2}=R_{B1}$ and rewriting:

$$\Delta V_{BE21} = n_F KT/q * \ln N + \{R_E[(N+N/β_2)-(1+1/β_1)] + + R_B(N/β_2 - 1/β_1)\}*I, \quad \text{[Eq. 12.1]}$$

$$\Delta V_{BE31} = n_F KT/q * \ln M + \{R_E[(M+M/β_3)-(1+1/β_1)] + + R_B(M/β_3 - 1/β_1)\}*I. \quad \text{[Eq. 12.2]}$$

Subtracting Eq. 12.1 from Eq. 12.2, we have:

$$\Delta V_{BE31} - \Delta V_{BE21} = n_F KT/q * (\ln M - \ln N) + \{R_E[(M+M/β_3)-(N+N/β_2)] + + R_B(M/β_3 - N/β_2)\}*I. \quad \text{[Eq. 12.3]}$$

$I_{fixed}$ is then set to a second set of three currents (a*I, a*N*I, a*M*I), which give rise to respective β values ($β_4, β_5, β_6$) when applied to the BJT. Value 'a' is made small enough—typically 1<a<2—such that $β_1≈β_4$, $β_2≈β_5$, and $β_3≈β_6$. Then:

$$\Delta V_{BE64} - \Delta V_{BE54} = n_F KT/q * (\ln M - \ln N) + \{R_E[(M+M/β_6)-(N+N/β_5)] + + R_B(M/β_6 - N/β_5)\}*a*I \quad \text{[Eq. 12.4]}$$

where $\Delta V_{BE64}=V_{BE6}-V_{BE4}$ and $\Delta V_{BE54}=V_{BE5}-V_{BE4}$, and $V_{BE4}, V_{BE5},$ and $V_{BE6}$ are $V_{BE}$ when $I_{fixed}$ equals a*I, a*N*I, and a*M*I, respectively.

If $β_1=β_4$, $β_2=β_5$ and $β_3=β_6$, and computing Eq. 12.4–Eq. 12.3:

$$[(\Delta V_{BE64} - \Delta V_{BE54}) - (\Delta V_{BE31} - \Delta V_{BE21})] = \{R_E[(M+M/β_3)-(N+N/β_2)] + R_B(M/β_3 - N/β_2)\}*(a-1)*I. \quad \text{[Eq. 12.5]}$$

If Eq. 12.5 is multiplied by 'b' such that (a−1)*b=1, then:

$$b*\{(\Delta V_{BE64} - \Delta V_{BE54}) - (\Delta V_{BE31} - \Delta V_{BE21})\} = \{R_E[(M+M/β_3)-(N+N/β_2)] + R_B(M/β_3 - N/β_2)\}*(a-1)*b*I = \{R_E[(M+M/β_3)-(N+N/β_2)] + R_B(M/β_3 - N/β_2)\}*1*I. \quad \text{[Eq. 12.6]}$$

Subtracting Eq. 12.6 from Eq. 12.3:

$$(\Delta V_{BE31} - \Delta V_{BE21}) - b*\{(\Delta V_{BE64} - \Delta V_{BE54}) - (\Delta V_{BE31} - \Delta V_{BE21})\} = n_F KT/q * (\ln M - \ln N) = n_F KT/q * (\ln M/N). \quad \text{[Eq. 12.7]}$$

Eq. 12.7 is the final result, which is independent of β and series resistance errors.

Thus, to make a temperature determination which is independent of β and series resistance when there is a large series resistance:

a first set of three emitter currents are sequentially forced, with $I_{fixed}$ set equal to I, N*I, and M*I, to produce $V_{be1}, V_{be2}, V_{be3}$, $\Delta V_{be21}=V_{be2}-V_{be1}$ and $\Delta V_{be31}=V_{be3}-V_{be1}$ values;

a second set of three emitter currents are sequentially forced, with $I_{fixed}$ set equal to a*I, a*N*I, and a*M*I to produce $V_{be4}, V_{be5}, V_{be6}, \Delta V_{be54}=V_{be5}-V_{be4}$ and $\Delta V_{be64}=V_{be6}-V_{be4}$ values;

value b=1/(a−1) is computed; and

Equation 12.7 is solved for T.

Note that the embodiments shown in FIGS. 1–8 are merely exemplary. There are many ways in which current forcing circuitry 12 could be implemented to provide a forced emitter current $I_E$ of the form $I_{fixed}+I_{fixed}/β$, thereby enabling β-related temperature measurement errors to be largely eliminated as described herein.

While particular embodiments of the invention have been shown and described, numerous variations and alternate embodiments will occur to those skilled in the art. Accordingly, it is intended that the invention be limited only in terms of the appended claims.

We claim:

1. A temperature sensing circuit, comprising:
   a bipolar transistor (BJT);
   a forced emitter current $I_E$ of the form $I_{fixed}+I_{fixed}/β$, where β is the BJT's β value, such that said BJT's base current is given by $I_{fixed}/β$ and its collector current is given by $I_{fixed}+I_{fixed}/β-I_{fixed}/β=I_{fixed}$;
   a current mirror circuit which mirrors said base current $I_{fixed}/β$ to said emitter; and
   a current source which provides an output current $I_{fixed}$ that switches between a first value I and a second value N*I such that said BJT's base-emitter voltage has a first value $V_{be1}$ when $I_{fixed}=I$ and a second value $V_{be2}$ when $I_{fixed}=N*I$, such that:

$$\Delta V_{be21} = V_{be2} - V_{be1} = (n_F kT/q)(\ln N),$$

where $n_F$ is the BJT's emission coefficient, k is Boltzmann's constant, T is absolute temperature in degrees Kelvin, and q is the electron charge.

2. The temperature sensing circuit of claim 1, wherein said BJT is a substrate PNP (SPNP) transistor.

3. The temperature sensing circuit of claim 1, wherein said current source is connected to provide $I_{fixed}$ to said BJT's emitter such that the current mirrored by said current mirror circuit is given by $I_{fixed}/β$.

4. The temperature sensing circuit of claim 1, wherein said current source is connected to provide $I_{fixed}$ to said BJT's base such that the current mirrored by said current mirror circuit is given by $I_{fixed}+I_{fixed}/β$.

5. The temperature sensing circuit of claim 1, wherein said current mirror circuit comprises:
   a first current mirror; and
   a second current mirror, said first current mirror arranged to mirror said base current $I_{fixed}/β$ to said second current mirror and said second current mirror arranged to mirror said mirrored base current to said BJT's emitter.

6. The temperature sensing circuit of claim 1, wherein said current mirror circuit comprises:
an operational amplifier having differential inputs and an output;
first and second nodes which are connected to respective ones of said differential inputs, said BJT's base connected to said first node;
a first element coupled between said first node and a circuit common point which conducts base current $I_{fixed}/\beta$ such that a voltage is developed at said first node which varies with $I_{fixed}/\beta$;
a first current mirror which receives the output of said amplifier and mirrors it to said BJT's emitter;
a second current mirror which receives the output of said amplifier and mirrors it to said second node; and
a second element coupled between said second node and said circuit common point which conducts said current mirrored by said second current mirror such that a voltage is developed at said second node which varies with the current mirrored by said second current mirror;
such that the current mirrored to said BJT's emitter is approximately equal to said base current $I_{fixed}/\beta$.

7. The temperature sensing circuit of claim 6, wherein said first and second elements are diodes.

8. The temperature sensing circuit of claim 6, wherein said first and second elements are diode-connected transistors.

9. The temperature sensing circuit of claim 6, wherein said first and second elements are resistors.

10. The temperature sensing circuit of claim 6, further comprising a chopping network connected between said first and second nodes and said first and second elements, said chopping network arranged to chop said first and second nodes between said first and second elements, respectively, and said second and first elements, respectively.

11. The temperature sensing circuit of claim 6, wherein said operational amplifier is chopped.

12. The temperature sensing circuit of claim 6, wherein said first and second current mirrors are chopped.

13. The temperature sensing circuit of claim 1, wherein said current mirror circuit comprises:
an operational amplifier having differential inputs and an output;
a current mirror arranged to mirror a current applied to an input terminal to said BJT's emitter;
first and second nodes which are connected to respective ones of said differential inputs, said BJT's base connected to said first node;
a transistor connected at its control input to the output of said amplifier and having its current circuit connected between said mirror's input terminal and said second node;
a first element coupled between said first node and a circuit common point which conducts base current $I_{fixed}/\beta$ such that a voltage is developed at said first node which varies with $I_{fixed}/\beta$; and
a second element coupled between said second node and said circuit common point which conducts said current conducted by said transistor such that a voltage is developed at said second node which varies with the current conducted by said transistor;
such that the current mirrored to said BJT's emitter is approximately equal to said base current $I_{fixed}/\beta$.

14. The temperature sensing circuit of claim 13, wherein said first and second elements are diodes, diode-connected transistors, or resistors.

15. The temperature sensing circuit of claim 13, further comprising a chopping network connected between said first and second nodes and said first and second elements, said chopping network arranged to chop said first and second nodes between said first and second elements, respectively, and said second and first elements, respectively.

16. The temperature sensing circuit of claim 13, wherein said operational amplifier and/or said current mirror are chopped.

17. The temperature sensing circuit of claim 1, further comprising circuitry arranged to receive $V_{be2}$ and $V_{be1}$ and to produce an output voltage that varies with $\Delta V_{be21}$.

18. The temperature sensing circuit of claim 1, wherein said current source is further arranged to switch output current $I_{fixed}$ between a third value $a*I$ and a fourth value $a*N*I$ such that said BJT has a third $V_{be}$ value $V_{be3}$ when $I_{fixed}=a*I$ and a fourth $V_{be}$ value $V_{be4}$ when $I_{fixed}=a*N*I$, such that:

$$\Delta V_{be43}=V_{be4}-V_{be3}, \text{ and:}$$

$$\Delta V_{be21}-\{b*(\Delta V_{be43}-\Delta V_{be21})\}=(n_F kT/q)(\ln N),$$

where $b=1/(a-1)$.

19. The temperature sensing circuit of claim 18, wherein 'a' is selected such that $\beta_3 \approx \beta_1$ and $\beta_4 \approx \beta_2$, where $\beta_1$, $\beta_2$, $\beta_3$ and $\beta_4$ are said BJT's $\beta$ values when $I_{fixed}=I$, $N*I$, $a*I$ and $a*N*I$, respectively.

20. The temperature sensing circuit of claim 1, wherein said current source is further arranged to switch output current $I_{fixed}$ to a third value $M*I$, and between a fourth value $a*I$, a fifth value $a*N*I$, and a sixth value $a*M*I$, such that said BJT has a third $V_{be}$ value $V_{be3}$ when $I_{fixed}=M*I$, a fourth $V_{be}$ value $V_{be4}$ when $I_{fixed}=a*I$, a fifth $V_{be}$ value $V_{be5}$ when $I_{fixed}=a*N*I$, and a sixth $V_{be}$ value $V_{be6}$ when $I_{fixed}=a*M*I$, such that:

$$\Delta V_{be31}=V_{be3}-V_{be1},$$

$$\Delta V_{be21}=V_{be2}-V_{be1},$$

$$\Delta V_{be64}=V_{be6}-V_{be4},$$

$$\Delta V_{be54}=V_{be5}-V_{be4}, \text{ and}$$

$$(\Delta V_{BE31}-\Delta V_{BE21})-b*\{(\Delta V_{BE64}-\Delta V_{BE54})-(\Delta V_{BE31}-\Delta V_{BE21})\}=n_F KT/q*(\ln M-\ln N)=n_F KT/q*(\ln M/N)$$

where $b=1/(a-1)$.

21. The temperature sensing circuit of claim 20, wherein 'a' is selected such that $\beta_1 \approx \beta_4$, $\mu_2 \approx \beta_5$, and $\beta_3 \approx \beta_6$, where $\beta_1$, $\beta_2$, $\beta_3$, $\beta_4$, $\beta_5$ and $\beta_6$ are said BJT's $\beta$ values when $I_{fixed}=I$, $N*I$, $M*I$, $a*I$, $a*N*I$, and $a*M*I$, respectively.

22. A method of sensing temperature using a bipolar transistor (BJT), comprising:
providing a BJT;
forcing an emitter current for said BJT which has the form $I_{fixed}+I_{fixed}/\beta$, where $\beta$ is the BJT's $\beta$ value, such that said BJT's base current is given by $I_{fixed}/\beta$ and its collector current is given by $I_{fixed}+I_{fixed}/\beta-I_{fixed}/\beta=I_{fixed}$; and
sequentially setting current $I_{fixed}$ equal to a first value I and a second value $N*I$ such that said BJT's base-emitter voltage has a first value $V_{be1}$ when $I_{fixed}=I$ and a second value $V_{be2}$ when $I_{fixed}=N*I$, such that:

$$\Delta V_{be21}=V_{be2}-V_{be1}=(n_F kT/q)(\ln N),$$

where $n_F$ is the BJT's emission coefficient, k is Boltzmann's constant, T is absolute temperature, and q is the electron charge.

23. The method of claim 22, wherein said forcing of said emitter current of the form $I_{fixed}+I_{fixed}/\beta$ comprises:
providing current $I_{fixed}$ to said BJT's emitter; and
mirroring said BJT's base current to its emitter.

24. The method of claim 22, wherein said forcing of said emitter current of the form $I_{fixed}+I_{fixed}/\beta$ comprises:
providing current $I_{fixed}$ to said BJT's base such that it is summed with said BJT's base current; and
mirroring said summed currents to said BJT's emitter.

25. The method of claim 22, further comprising setting said current $I_{fixed}$ equal to a third value $a*I$ and a fourth value $a*N*I$ such that said BJT has a third $V_{be}$ value $V_{be3}$ when $I_{fixed}=a*I$ and a fourth $V_{be}$ value $V_{be4}$ when $I_{fixed}=a*N*I$, such that:

$$\Delta V_{be43}=V_{be4}-V_{be3}, \text{ and:}$$

$$\Delta V_{be21}-\{b*(\Delta V_{be43}-\Delta V_{be21})\}=(n_F kT/q)(\ln N),$$

where $b=1/(a-1)$.

26. The method of claim 25, wherein 'a' is selected such that $\beta_3 \approx \beta_1$ and $\beta_4 \approx \beta_2$, where $\beta_1, \beta_2, \beta_3$ and $\beta_4$ are said BJT's $\beta$ values when $I_{fixed}=I, N*I, a*I$ and $a*N*I$, respectively.

27. The method of claim 22, further comprising setting said current $I_{fixed}$ equal to a third value $M*I$, a fourth value $a*I$, a fifth value $a*N*I$, and a sixth value $a*M*I$, such that said BJT has a third $V_{be}$ value $V_{be3}$ when $I_{fixed}=M*I$, a fourth $V_{be}$ value $V_{be4}$ when $I_{fixed}=a*I$, a fifth $V_{be}$ value $V_{be5}$ when $I_{fixed}=a*N*I$, and a sixth $V_{be}$ value $V_{be6}$ when $I_{fixed}=a*M*I$, such that:

$$\Delta V_{be31}=V_{be3}-V_{be1},$$

$$\Delta V_{be21}=V_{be2}-V_{be1},$$

$$\Delta V_{be64}=V_{be6}-V_{be4},$$

$$\Delta V_{be54}=V_{be5}-V_{be4}, \text{ and}$$

$$(\Delta V_{BE31}-\Delta V_{BE21})-b*\{(\Delta V_{BE64}-\Delta V_{BE54})-(\Delta V_{BE31}-\Delta V_{BE21})\}=n_F KT/q*(\ln M-\ln N)=n_F KT/q*(\ln M/N)$$

where $b=1/(a-1)$.

28. The method of claim 27, wherein 'a' is selected such that $\beta_1 \approx \beta_4, \beta_2 \approx \beta_5,$ and $\beta_3 \approx \beta_6$, where $\beta_1, \beta_2, \beta_3, \beta_4, \beta_5$ and $\beta_6$ are said BJT's $\beta$ values when $I_{fixed}=I, N*I, M*I, a*I, a*N*I,$ and $a*M*I$, respectively.

* * * * *